No. 706,239. Patented Aug. 5, 1902.
L. T. JOHNSON.
PRICE SCALE.
(Application filed Apr. 9, 1901.)
(No Model.) 2 Sheets—Sheet 1.

Witnesses
Geo. E. Frech.
Chas. R. Wright Jr.

Inventor
Leonard T. Johnson
James W. Bevans
his Attorney

No. 706,239. Patented Aug. 5, 1902.
L. T. JOHNSON.
PRICE SCALE.
(Application filed Apr. 9, 1901.)
(No Model.) 2 Sheets—Sheet 2.
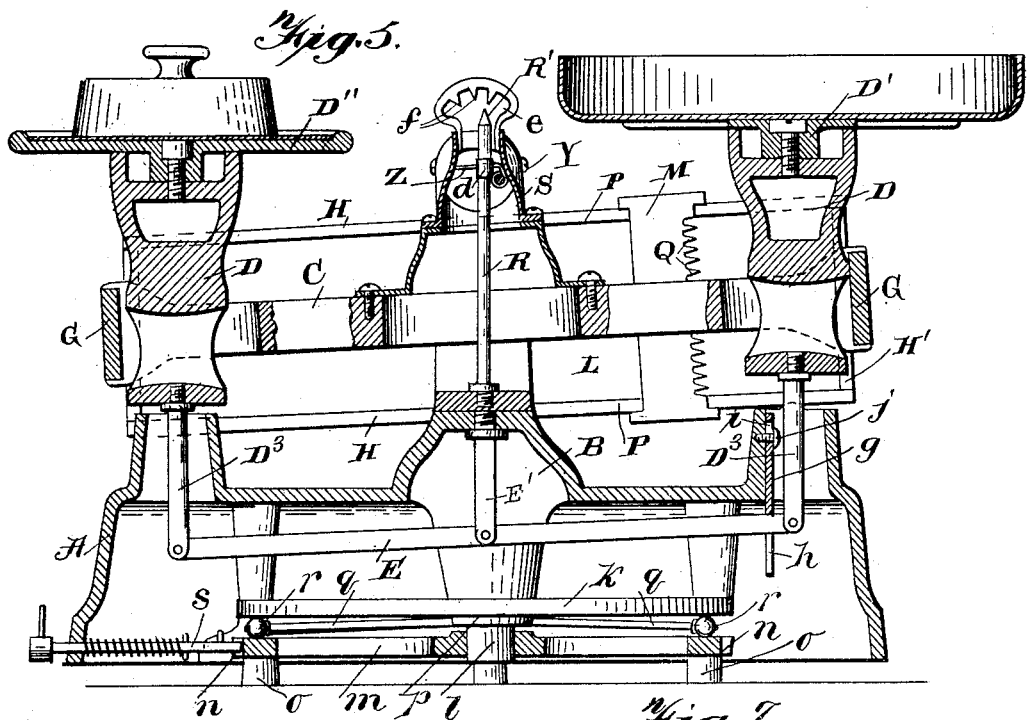
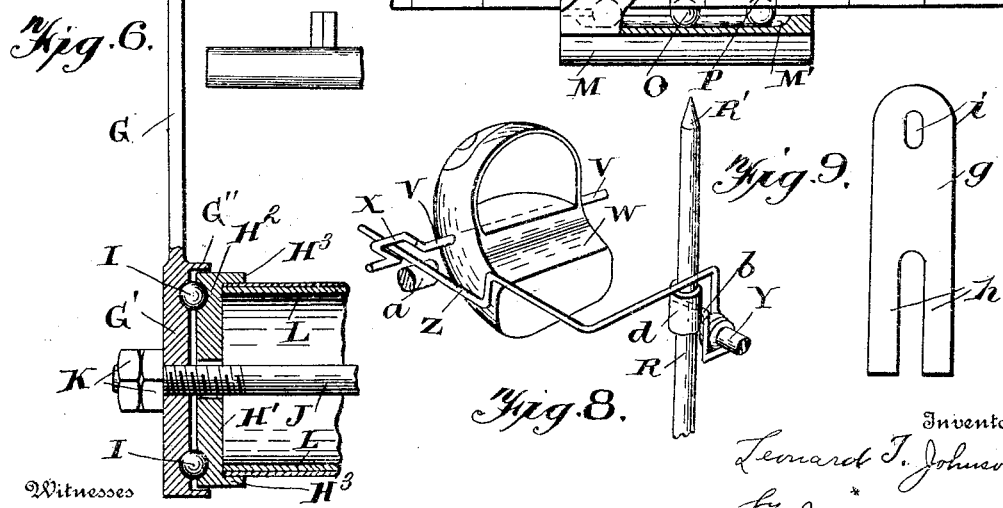
Witnesses
Geo. E. Frech.
Chas. R. Wright Jr.
Inventor
Leonard T. Johnson
by James W. Bevans
his Attorney

UNITED STATES PATENT OFFICE.

LEONARD T. JOHNSON, OF BROOKLYN, NEW YORK.

PRICE-SCALE.

SPECIFICATION forming part of Letters Patent No. 706,239, dated August 5, 1902.

Application filed April 9, 1901. Serial No. 55,059. (No model.)

*To all whom it may concern:*

Be it known that I, LEONARD T. JOHNSON, a citizen of the United States, residing at New York, in the borough of Brooklyn and State of New York, have invented certain new and useful Improvements in Price-Scales; and I do hereby declare the following to be a full, clear, and exact description of the invention, such as will enable others skilled in the art to which it appertains to make and use the same.

This invention relates to improvements in price-scales, and particularly to scales of the "even-balance" class, having means for indicating the prices of different quantities of articles at various prices per pound.

The object of the invention, generally stated, is to improve the construction of scales of this class and to produce a scale which is convenient in operation, simple in construction, and neat and attractive in appearance.

More specifically stated, the objects are, first, to so construct and arrange the chart or panel carrying the computations and the poise which slides thereon that the former may be readily swung upon its bearings to bring either of its faces in operative position and the latter conveniently and easily moved back and forth thereon and to so arrange the weight-scale that the graduations thereof may be quickly read; second, to provide means for starting the pan end of the beam in its movement toward equilibrium when the quantity of the article in the pan is a predetermined amount less than the quantity necessary to balance the weight, or, in other words, to provide a near-weight device which will automatically cause the pan end of the beam to begin its downward movement when nearly the proper quantity of the article has been placed in the pan, and to provide a novel and effective visual signal operated by the movement of the beam to indicate to the user the fact of near weight.

With the above objects in view the invention consists in the novel features of construction hereinafter fully described, particularly pointed out in the claims, and clearly illustrated by the accompanying drawings, in which—

Figure 1:
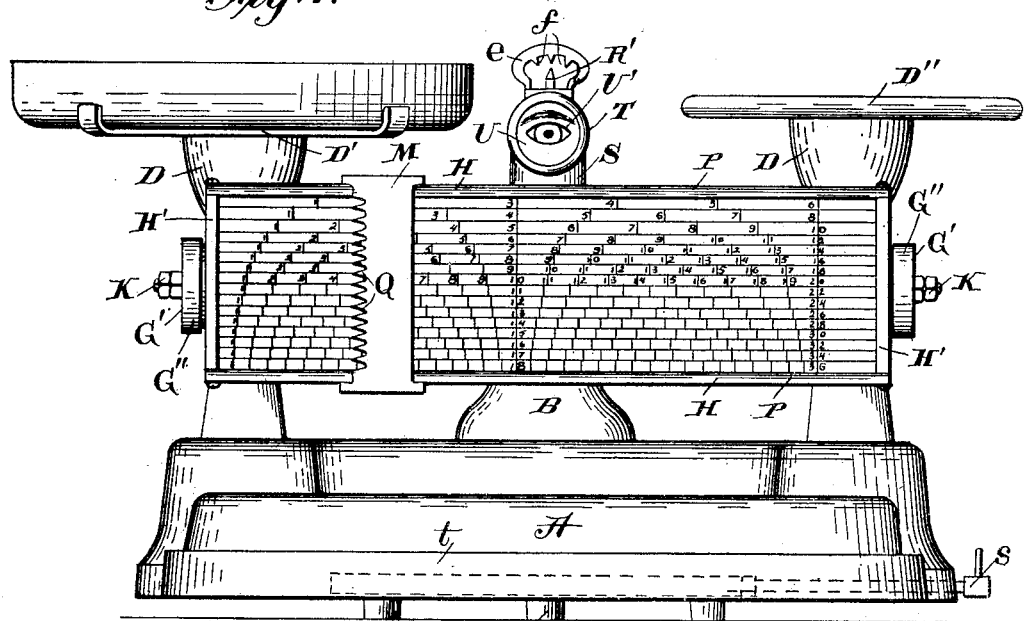
Figures 2, 3, 4:
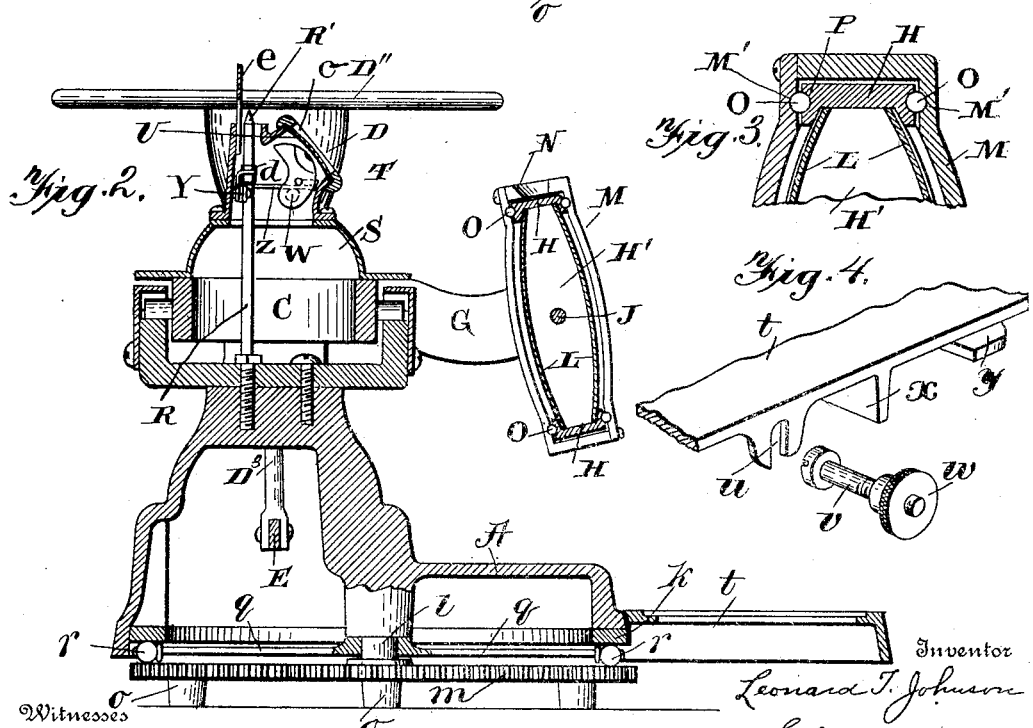

Figure 1 is a front elevation of an even-balance scale constructed in accordance with my invention; Fig. 2, a central transverse section of the same; Fig. 3, an enlarged sectional detail view showing the manner of mounting the sliding poise upon the chart; Fig. 4, an enlarged detail view in perspective, showing construction of the weight-support whereby the same is detachable; Fig. 5, a vertical longitudinal sectional view of the scale; Fig. 6, an enlarged detail, partly in top plan and partly in section, showing one of the chart-supporting arms and the manner of mounting the swiveled chart; Fig. 7, a detail view, being a top plan view, partly in section, of the sliding poise and a portion of the weight-scale; Fig. 8, an enlarged perspective view showing the signal mechanism; and Fig. 9, a face view, enlarged, of the near-weight device.

Referring now more particularly to the drawings, A indicates the hollow base, having a post B raised centrally therefrom and provided at its upper end with bearings for the journals of the beam C, which carries at its respective ends standards D, pivotally mounted thereon and having at their upper ends disks D' and D'' to receive, respectively, the removable pan and weights and at their lower ends downwardly-extending stems $D^3$, which project to the interior of the base and are pivotally attached to the ends of the check-rod E, which is intermediately pivoted to an arm E', depending from the central portion of the base, all of which are common to the ordinary construction of even-balance scale.

The beam C is provided at its ends with forwardly-extending arms G, said arms being disposed transversely of the scale and formed at their outer ends with circular enlargements G', centrally perforated and having upon their inner faces annular grooves surrounded by annular flanges G''.

The chart carrying the computations is mounted between said arms G and comprises a frame having longitudinal side bars H, grooved upon their under sides and having upon their outer sides graduations representing pounds and ounces and constituting the weight-scales. The side bars are secured to end bars H', provided on their outer faces with circular enlargements or trunnions $H^2$ of proper size to fit in the spaces inclosed by the annular flanges G'' of arms G and provided with annular grooves, forming with the grooves of said arms ball-races to receive antifriction-balls I. The chart is retained in position between the arms by a rod J, extending longitudinally thereof, with its ends projecting through perforations formed in the end pieces and the perforations of arms G and screw-threaded to receive nuts K. The frame is provided with two curved panels L, placed with their convexed sides outward and retained in position by having their side edges inserted in the grooves formed in the under sides of the end bars of the frame and by flanges $H^3$ on the inner faces of the end bars. Computations are arranged upon the panels representing the prices for different quantities at different prices per pound.

A poise M is movable upon the chart, consisting of an inclosing band conforming to the cross-sectional contour of the chart and having its end pieces notched to form pointers N, adapted to coact with the weight-graduations upon the outer sides of the side bars of the frame. The side pieces of the poise are provided on their inner faces and near the respective ends of the poise with transversely-extending grooves M', closed at their ends to receive antifriction-balls O, which move in longitudinally-extending grooves P, formed in the longitudinal edges of the side bars of the chart-frame, as the poise is moved back and forth thereon. The poise is so supported upon the chart that the under sides of its end pieces are out of contact with the surfaces of the weight-scales, so that the latter are not worn or marred by the movement of the poise and the weight-graduations not worn away or obliterated. The side pieces of the poise are provided at one of their edges with fingers or projections Q, which coact with the computations upon the sides of the chart to indicate the total prices of different quantities at different prices per pound, the total-price numerals being upon the chart and the price-per-pound numerals upon the poise.

Secured to post B is a stationary arm R, and attached to the upper portion of the beam at the center thereof is a casing S, surrounding said arm and having a contracted open upper end through which the arm projects, and is formed with a pointed end R', constituting a pointer for the purpose hereinafter set forth. Said casing has the upper portion of its front wall disposed at an angle and formed with a circular opening having an encircling flange T. Secured in said opening is a plate U, having an eye-shaped opening U'' formed therein, and pivotally mounted in the casing behind said opening upon a shaft V is a swinging member W, representing a human eyeball. Said shaft is formed with a cranked portion X, as clearly illustrated in Fig. 8, which is engaged by the free end of an operating-lever Z. This lever is pivotally mounted upon a stud or pin Y and has its free end disposed beneath said cranked portion and supported by a pin or stud $a$ in the side wall of the casing. Said lever also has a laterally-extending arm $b$ near its pivotal end and so disposed as to engage the stationary arm R when the weight end of the beam is moved downwardly by the poise or by the placing of a weight thereon, thus causing the free end of the lever to move upwardly and through the medium of the cranked portion of the shaft effect the swinging of the eyeball member to bring the pupil of the eye above the eye-opening, giving to the representation of the eye the appearance of being closed. The eyeball member is held in this position until the arm $b$ of the lever is moved out of contact with the fixed arm R by the downward movement of the pan end of the beam, when said member returns to its normal position by gravity. Thus when a weight is placed upon the weight-disk or the poise is moved to the desired point upon the chart the eye is immediately closed and remains so until nearly the proper amount has been placed in the pan to equal the weight, when it opens, warning the user that he is near weight. It will thus be seen that I have provided a very attractive and effective signal for the purpose of notifying the user that nearly the proper quantity of material has been placed in the pan to balance the weight. A transparent plate $c$ covers the opening in the casing and protects the plate U and eyeball member W from injury, and a sleeve $d$, of flexible material, is placed upon the arm R to prevent marring of the eyeball by contact of the same with said arm when it is swung away from the eye-opening of plate U.

Extending above the open upper end of the casing is an arch-shaped piece $e$, having its legs projecting into and secured to the casing. This piece $e$ has depending therefrom three projections or points $f$ to coact with the pointed end of arm R, the central one indicating even balance and the side ones overweight and underweight.

For starting the pan end of the beam on its movement toward equilibrium when less than proper quantity of material to balance the weight has been placed in the pan I provide the following device: Mounted in the base so as to be capable of a limited up-and-down movement is a plate $g$, which is disposed adjacent to the stem carrying the pan-receiving disk and has its lower end bifurcated, with the bifurcations $h$ thereof straddling the check-rod E. At its upper end said plate is formed with an elongated slot $i$, through which a screw or pin $j$ passes and by means of which it is attached to the base. When the beam is in equilibrium, this plate does not bear upon the check-rod; but as soon as the weight end of the beam is moved downwardly by the poise or by a weight placed on the weight-receiving disk the check-rod is moved upwardly into contact therewith, lifting it, as clearly illustrated in Fig. 5. The weight of the plate is then exerted upon the pan end of the beam, and said plate may be made of any desired weight—for instance, one ounce. With the plate acting upon the pan end of the beam with a pressure equal to one ounce the pan end will be started on its downward movement when all but one ounce of the quantity of material necessary to balance the weight has been placed in the pan. This movement of the beam will operate the signal, as before set forth, causing the eye to open, giving warning to the user that he is near weight. When the plate has moved downwardly with the check-rod a distance equal to the length of the slot $i$, further movement thereof will be prevented by the contact of the end wall of the slot with the pin or screw $j$, so that the check-rod in its further downward movement will be relieved of the pressure of said plate, and in order to bring the beam into equilibrium it will be necessary to place an ounce more of the material into the pan. Thus it will be seen that while the plate by acting upon the pan end of the scale with a pressure of one ounce starts the beam in its movement toward equilibrium, yet its action is removed before the beam reaches equilibrium, so that there is no shortage in weight. It will be understood that the near-weight plate may be made of any desired weight, so that the pan end of the beam will be started in its downward movement when the material in the pan is any preferred amount less than that necessary to balance the weight. This near-weight device forms a very advantageous and desirable attachment, as in the ordinary construction of scale the pan end of the beam does not start on its downward movement until all of the quantity necessary to balance the weight has been placed in the pan, and this being so before the user can stop the flow of material from the scoop there is overweight, which makes it necessary either to remove the quantity in excess of the proper weight, which consumes time, or permit the same to remain and lose the value thereof.

The base has secured thereto on its under side a rim $k$ and is provided with a centrally-depending post $l$, having a pivotal connection with a circular support $m$, formed about its periphery with notches $n$ and provided with feet $o$. Pivotally attached to the post is a collar $p$, carrying radially-extending arms $q$, upon the ends of which rollers $r$ are mounted, said rollers being interposed between the rim $k$ and support $m$. Thus the scale is swiveled, so that it may be swung upon the support to present the computing-chart either to the dealer or the purchaser or to convenient position for weighing.

For locking the scale to the support when desired a spring-held bolt $s$ is provided, adapted at its inner end to engage the notched periphery of the support and at its outer end provided with a suitable handle.

For supporting the weights a shelf $t$ is provided, and for convenience in shipping it is made detachable, having formed on its inner edge for this purpose slotted lugs $u$ to receive the screw-bolts $v$, which extend through perforations in the front edge of the base and are provided with thumb-nuts $w$. Said shelf at its inner edge is formed with downwardly-extending shoulders $x$, abutting the outer face of the front portion of the base, and with horizontally-disposed lugs $y$, entering slots in the base, so that the shelf is firmly supported and a very strong and convenient construction provided.

While I have illustrated and described my invention in connection with an even-balance scale, I do not desire to limit the same thereto, as the chart and poise and the near-weight device and signal as shown and described with slight modifications may be applied to other forms of scales.

Having thus fully described my invention, what I claim as new, and desire to secure by Letters Patent of the United States, is—

1. In a weighing-scale, the combination with the beam, of a signal comprising a pivoted member, and an actuating-lever, both of which are carried by the beam, and a member mounted independently of the beam and adapted to be engaged by said lever, substantially as described.

2. In a weighing-scale, the combination with the beam, of a signal comprising a casing mounted upon the beam, a pivoted member in said casing, an actuating-lever pivoted in said casing for effecting the movement of the pivoted member, and a member mounted independently of the beam and adapted to be engaged by said lever, substantially as described.

3. In a weighing-scale, the combination with the beam, of a signal comprising a casing mounted upon the beam and having an aperture, a pivoted member mounted in said casing behind said aperture, an operating-lever pivoted in said casing and adapted to actuate said pivoted member and having an arm, and an arm fixed to the base of the scale and positioned in said casing in the path of said lever-arm, substantially as described.

4. In a weighing-scale, the combination with the beam, of a signal comprising an apertured casing mounted upon the beam and having an opening in its top wall, an arched plate above said open end having indicating projections, a pivoted member in said casing, an operating-lever pivoted in the casing and adapted to actuate the pivoted member, and an arm fixed to the base of the scale and disposed in said casing and adapted to effect the movement of said lever and having its upper end projecting through the open end of the casing and adapted to coact with the indicating projections of the arched plate, substantially as described.

5. In a scale, the combination with the beam, of a signal operated by the movement thereof, comprising a pivoted member mounted upon a crank-shaft, and an operating-lever actuated by the movement of the beam and adapted to engage the crank of said shaft, substantially as described.

6. In a scale, the combination with the beam, of a signal operated by the movement thereof, comprising a pivoted member mounted upon a crank-shaft, a pivoted lever having its free end disposed beneath the crank of said shaft, a support for the free end of the lever, said lever having an arm near its pivotal point, and a member adapted to actuate said lever by engagement with said arm, substantially as described.

7. In a scale, the combination with the base formed with perforations and slots, of a detachable weight-shelf formed with horizontally-disposed lugs adapted to enter said slots, and with vertically-disposed shoulders adapted to bear against the outer surface of the base, and with slotted lugs, and securing members adapted to pass through said perforations and slotted lugs, substantially as described.

In testimony whereof I affix my signature in presence of two witnesses.

LEONARD T. JOHNSON.

Witnesses:
W. F. HUMMER,
JAMES W. BEVANS.